Sept. 9, 1969     YOSHITAKE KASHIMA     3,466,584
WINDING FOR A STATIONARY INDUCTION ELECTRICAL APPARATUS
Filed June 22, 1967                                3 Sheets-Sheet 1

INVENTOR: YOSHITAKE KASHIMA

BY: Paul M. Craig, Jr.
ATTORNEY

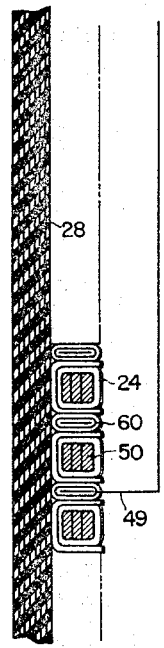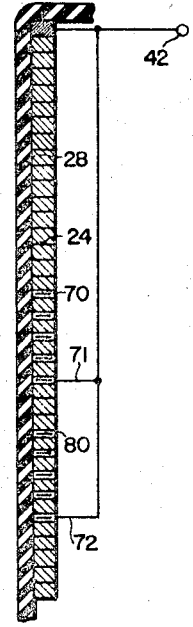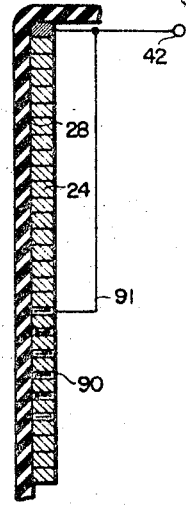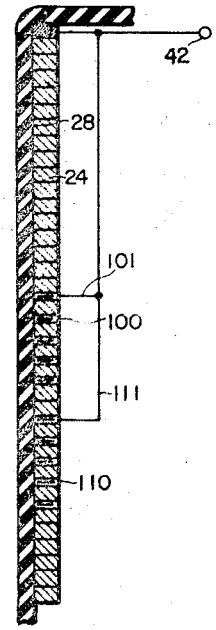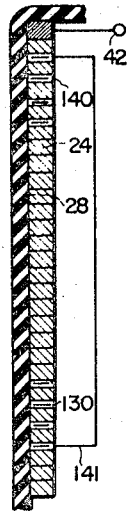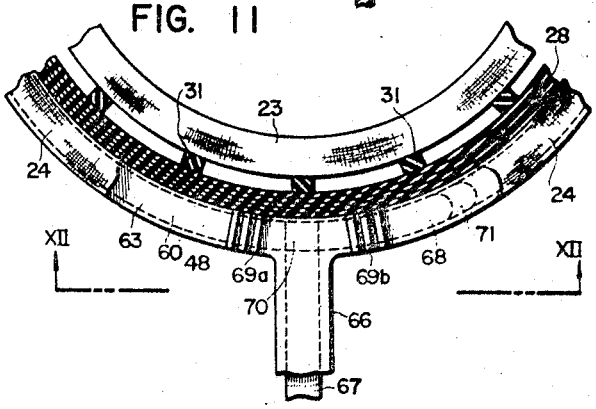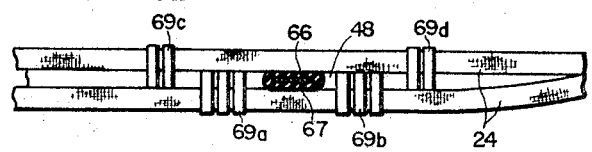

United States Patent Office

3,466,584
Patented Sept. 9, 1969

3,466,584
WINDING FOR A STATIONARY INDUCTION
ELECTRICAL APPARATUS
Yoshitake Kashima, Hitachi-shi, Japan, assignor to
Hitachi, Ltd., Tokyo-to, Japan
Filed June 22, 1967, Ser. No. 648,084
Claims priority, application Japan, June 22, 1966,
41/40,097; Oct. 26, 1966, 41/70,192; Nov. 21,
1966, 41/106,618
Int. Cl. H01f 15/14, 27/28
U.S. Cl. 336—70          19 Claims

ABSTRACT OF THE DISCLOSURE

A multi-layer winding assembly for a power transformer is provided with a shielding winding conductor which is disposed between the main winding conductor in either the most exterior winding layer or the most interior winding layer and which is supplied with either the line side potential or the earth-side potential so as to improve the potential distribution in the winding at the instant a sharp impulse voltage or a lightning surge is applied thereto.

Background of the invention

The present invention relates to a multi-layer concentrically arranged cylindrical winding assembly for a stationary induction apparatus, and more particularly, to a statically shielded, multi-layer, high voltage winding of a power transformer.

In high voltage windings of power transformers, it has been the practice to increase the series capacitance of the windings so as to improve their impulse voltage handling characteristics. Generally speaking, a disc winding or multi-layers of helical windings have been utilized in high voltage winding structures where the multi-layer terminology is employed to describe a plurality of concentric, cylindrically-shaped, helical windings. One known method for increasing series capacitance of a disc winding is disclosed in U.S. Patent No. 2,905,911 where between turns of the main conductors of a disc coil unit, a shielding conductor is wound and is provided with a potential of the line side or another disc coil unit. According to this known construction, the potential distribution in the disc winding upon application of an impulse voltage is equalized along substantially its whole length, owing to static charging currents through the shielding conductor. Another known method of construction is to adopt a so-called Hisercap winding in which a main conductor itself in a particular disc coil unit is pulled to and wound in another coil unit, and then is again pulled back to and wound in the particular coil unit. This is done with each disc coil unit so that each disc coil unit is provided with a potential from certain other coil units by means of the main conductors themselves.

However, these known methods of construction have a defect in that they are complicated and enlarge the size of the winding. According to the first known method, the diameter of the winding increases due to the additional turns of the shielding conductor inserted between the main winding conductor in each coil unit and, in addition, its construction becomes complicated and expensive. With respect to the second known method, pulling around of the main winding conductors makes the winding operation complicated and results in a complicated interwoven winding structure.

In contrast to the disc coil type of construction, a multi-layer winding which is comprised by a multiplicity of cylindrically arranged, helical winding layers disposed concentrically around a low voltage winding and a core, by its nature, has larger series capacitance than a disc winding. This is due to the fact that the electrostatic coupling of each cylindrical winding layer to the opposing winding layers provides a large series capacitance resulting from large opposing areas and a short opposing distance determined by the spacing apart of the concentrically arranged layers. The large series capacitance provides an equalized potential distribution in the winding against an applied impulse voltage since the potential gradient $\gamma P/\gamma X$ in the winding is determined by the following relation. In reference to the potential gradient in the equalized potential distribution $$\left(\frac{\gamma P}{\gamma X}\right) q$$

shunt capacitance of the winding to earth $C_g$, and series capacitance of the winding $C_s$ are related as follows:

$$\frac{\gamma P}{\gamma X} = k\left(\frac{\gamma P}{\gamma X}\right) q \cdot \sqrt{\frac{C_g}{C_s}} \qquad (1)$$

Though a multi-layer winding is superior to a disc winding with respect to the equalized potential distribution, unbalanced potential distribution in a cylindrical winding layer, especially, in the most exterior or the most interior cylindrical winding layer, can give rise to serious damage to winding insulation as the power capacity of a transformer increases. In a transformer of large kva. rating, each cylindrical winding layer has a large number of turns of a main conductor therein so that the initial potential distribution in the most exterior layer can become unbalanced or oscillate and a similar phenomenon occurs in the successive layers when an impulse voltage enters from the line side. There will be a similar unbalanced potential distribution in the most interior layer when an impulse voltage enters from the other side or the earth side in case of a star connection transformer.

In order to improve the potential distribution of multi-layer windings, a shielding technique has been practiced hitherto in which a static shielding plate is disposed outside the most exterior cylindrical winding layer and the line-side potential is applied to the shielding plate. This shielding plate is formed from a conductive strip, foil, or mesh and is divided piecemeal so as to prevent the development of circulatory currents and to reduce eddy current losses. One of the disadvantages of this shielding technique is that since shielding means supplied with the line side voltage is disposed around the most exterior cylindrical winding layer, the thickness of the insulating layer of the winding has to be increased. As a result the diameter of the overall winding structure including the shielding means is considerably increased. Another disadvantage is that since a thin shielding conductor should be utilized to avoid eddy currents, it cannot be provided with sufficient dielectric strength and mechanical strength. If a thick shielding conductor is utilized to increase the dielectric strength and mechanical strength a great amount of eddy current loss is generated therein due to linkages or leakage fluxes and the temperature of the shielding conductor rises extremely, resulting in burnout, etc.

Summary of the invention

The main object of the present invention is to provide a winding for a stationary induction electrical apparatus having a static shielding means which does not increase the diameter of the winding.

Another object of the present invention is to provide a winding for a transformer or a reactor having static shielding means of sufficient dielectric and mechanical strength.

Still another object of the present invention is provision of a winding for a stationary induction electrical apparatus having good shielding characteristics against incoming impulse voltages such as a lightning surge.

In carrying out the above objects of the present invention, a shielding conductor is wound in the axial direction in either the most exterior cylindrical winding layer or the most interior cylindrical winding layer or both of them in a multi-layer cylindrically arranged, helical winding assembly with the adjoining main conductor winding turns and the shielding conductor winding turns being axially aligned and interleaved. One end of the shielding conductor winding is electrically connected to the vicinity of either the input terminal (line side) or the output terminal (earth side) to be supplied with a suitable potential, and the other end thereof is electrically open and is interwound into the cylindrical winding layer in the axial direction. Instead of the input or output terminal of the cylindrical winding, a supplemental winding in the winding layer, like a second shielding conductor may be used to supply a potential to the shielding winding.

Multi-layer winding assemblies constructed in the above described manner to provide a shielding conductor, adjoining the main conductor in the axial direction in the most exterior or interior cylindrical winding layer of a multi-layer winding can have a different potential from those of the adjoining main conductor supplied to the shielding conductor, thus resulting in a great potential difference therebetween. Accordingly, the series capacitance between turns in the most exterior or interior winding layer is greatly increased and the potential distribution upon entrance of an impulse voltage into a multi-layer winding assembly thus constructed, can be equalized substantially along the whole length of the winding.

According to the present invention, since the static shielding means comprises a shielding conductor wound in a cylindrical winding layer together with main conductors, provision of the shielding means does not cause any increase in the diameter of the winding and reduction in the overall size of a power transformer is accomplished. In addition, since the shielding means is constructed by winding a shielding conductor in the winding layer instead of using conductive strips, foils, or meshes provided around the layer, the cover insulation thereof can be minimized, and its dielectric strength can be increased as well as its mechanical strength.

Brief description of the drawings

These and other objects, features and attendant advantages of the present invention will be apparent from the following description taken in connection with the accompanying drawings in which:

FIGURE 4 is a sectional view corresponding to FIGURE 2 and showing a different embodiment of the present invention;

FIGURES 6 through 10 are schematic longitudinal sectional views showing various different arrangements of shielding means according to the present invention;

FIGURE 11 is a partial plan view to show the construction of an end of a shielding conductor wound in the winding layer and the nature of the connection to it;

FIGURE 12 is a longitudinal view of FIGURE 11 taken along the line XII—XII;

Throughout the several views, like reference characters or numerals are used to designate like or corresponding parts or devices.

Detailed description of the embodiments

Figure 1:
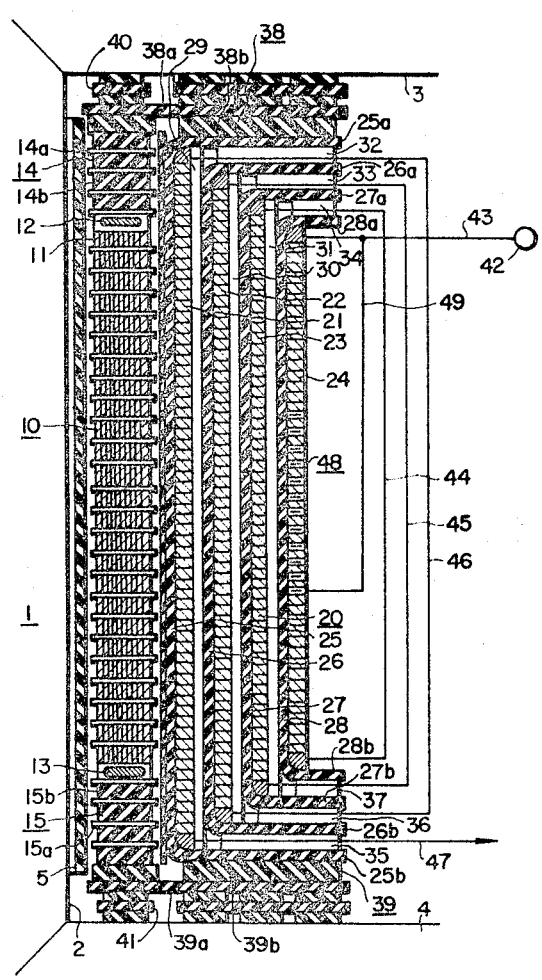
FIGURE 1 is a longitudinal sectional view showing one half of a winding construction of one phase of a transformer having a multi-layer voltage winding assembly constructed according to the invention.

In FIGURE 1, 1 denotes a core of a transformer, which is composed of a leg portion 2, an upper yoke portion 3, and a lower yoke portion 4 each comprising laminated magnetic steel plates constructed in a manner well known in the art. Around the leg portion 2 are wound a low voltage winding 10 and a high voltage multi-layer winding assembly 20 on an insulating cylinder 5. The low voltage winding 10 for the transformer is of a large capacity and utilizes a helical type winding which has large mechanical strength. High voltage, multi-layer winding assembly 20 also employs helical type windings as will be described hereinafter.

Low voltage winding 10 comprises a multiplicity (several tens) of turns, each of which is formed from an insulator coated conductor 11. The several turns are arranged radially and wound parallel to each other to form a complete turn at one level, and the several levels are stacked to form low voltage winding 10. At the upper and lower ends of low voltage winding 10 is provided annular clamp rings 12 and 13, respectively, and between respective clamp rings 12, 13 and upper and lower yoke portions 3 and 4, are inserted insulating means to earth 14, 15. The insulating means to earth 14, 15 are constructed by stacking alternately ring insulators 14a, 15a and rectangular duct pieces 14b, 15b, respectively, so as to form conduits or ducts for insulating liquid between each of the ring insulators 14a, 15a. Ring insulators 14a, 15a and duct pieces 14b, 15b are ordinarily made of pressboard or insulating wood. On the respective inner and outer peripheries of low voltage winding 10 are provided axially a plurality of rectangular straight duct members 31 (shown in FIGURE 11) with certain distances or spaces between each other in order to form axial conduits for insulating liquid.

High voltage winding 20 is composed of a multi-layer winding assembly in which a plurality of cylindrical winding layers 21–24 are stacked concentrically around the low voltage winding 10. Cylindrical winding layers 21–24 are wound on cylindrically-shaped paper laminated insulators 25–28 made of kraft paper or linter paper. The upper end of the most exterior cylindrical winding layer 24 is connected through conductor 43 to the high voltage input terminal 42 (the line side) and the lower end of the most interior cylindrical winding layer to the other terminal (or the earth side). The axial lengths or heights of the winding layers 21–24 are gradually decreased so as to increase insulating distances to earth accordingly from the most interior layer 21 to the most exterior layer 24.

In the manufacture of the multi-layer winding assembly, the most interior cylindrical winding layer 21 is wound around laminated insulator 25 and thereafter laminated paper layers of the upper or lower part of insulator 25 may be cut in the axial direction in a staggered manner to form integral flange portions 25a, 25b by integrally piling cut pieces of different layers. On the outer periphery of winding layer 21 with certain distances between each other in the space 29 are disposed axially a plurality of straight duct pieces similar to the axially extending duct pieces 31 shown in FIGURE 11. Then a second cylindrical, laminated insulator 26 is wound therearound. A second winding layer 22 is wound on the second laminated insulator 26 which also is provided with flange portions 26a, 26b at the upper and lower ends thereof. Thereafter, laminated insulators 27, 28 and cylindrical winding layers 23, 24 are disposed and constructed in the same manner. 29–31 are straight, axially, extending, rectangular duct pieces inserted between opposing cylindrical winding layers to form axial ducts or conduits for insulating cooling liquid. 25a, 25b, 26a, 26b, 27a, 27b, 28a and 28b are respective integral flange portions of laminated insulators 25–28 and 32–37 are rectangular duct pieces provided between flange portions. By means of these duct pieces 32–37 and 29–31, ducts for cooling liquid are formed to complete a circle along the outer surfaces of cylindrical winding layers 21–24 and flange portions of laminated insulators 25–28. Accordingly, insulating liquid filled therein can flow through the ducts and cool effectively the winding. Ducts formed between the flange portions may be further used to run in electrical connections to cylindrical winding layers 21–24.

Insulators to earth 38 and 39 are provided between high voltage winding 20, the upper yoke portion 3 and the lower yoke portion 4, respectively, and are constructed in the same manner as insulators 14 and 15. Ring insulating plates 38a, 39a and rectangular duct pieces 38b, 39b are piled alternately to form ducts for insulating liquid. Insulators 40 and 41 are provided for clamping the ring insulating plates 38a and 39a commonly to high voltage winding 20 and low voltage winding 10 between the upper and lower yoke portions 3 and 4.

The input terminal 42 of high voltage winding 20 is connected to the line through a terminal bushing secured on the container and a lead wire 43 connects the input terminal 42 to the upper end of the most exterior winding layer 24. Lead wires 44–46 connect lower ends of winding layers 24–22 to upper ends of winding layers 23–21 respectively, and a lead wire 47 connects the lower end of winding layer 21 to the output terminal (not shown). These electrical connections are made through the ducts formed between flange portions of laminated insulators 25–28.

According to the invention, static shielding means 48 (best seen in FIGURE 2) is wound in between intermediate turns of the most exterior winding layer 24 and is electrically connected to lead wire 43 through a lead wire 49 to be supplied with the line side voltage.

Figure 2:
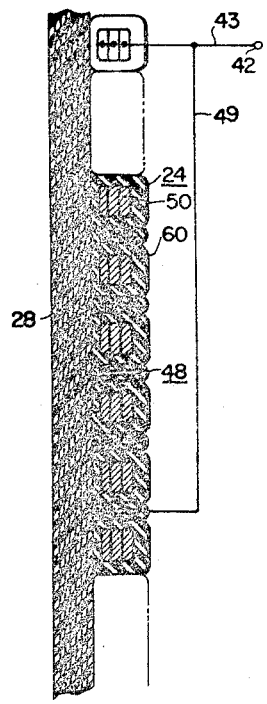
FIGURE 2 is a partial longitudinal sectional view showing only the most exterior cylindrical winding layer of the multi-layer winding assembly shown in FIGURE 1.
Figure 3:
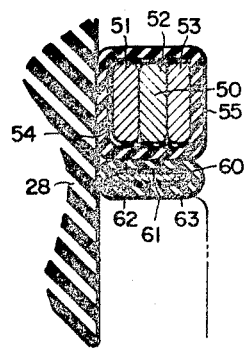
FIGURE 3 is a sectional view showing in detail the construction of the main conductor and the shielding conductor shown in FIGURE 2.

FIGURES 2 and 3 show a construction of the above shielding means 48 in detail. A main conductor 50 is helically wound continuously on laminated insulator 28 to form the cylindrical winding layer 24 and is comprised of a plurality of divided wires so as to reduce eddy current losses due to linkages of leakage fluxes. As shown in FIGURE 3, main conductor 50 is comprised by three elemental wires 51, 52 and 53 and is coated by an inner, reinforcing insulating layer 54, and an outer supplemental insulating layer 55. Reinforcing insulating layer 54 is constructed in the form of a strip of U-shape cross section in which the bottom of U-shape is disposed to point towards insulating layer 28 and it is preferably made of resin insulators such as polycarbonate and polyethylene which have greater break-through dielectric strength than kraft paper or linter paper.

Shielding means 48 is comprised by an insulated shielding conductor 60 which is helically wound in between a plurality of intermediate turns of main conductor 50 with the adjoining turns of main conductor 50 and shielding conductor coil 60 being axially aligned and interleaved. As shown in FIGURE 3, shielding conductor coil 60 is comprised by a conductive strip 61 of aluminum foil or a foil plated with a conductive layer, an inner reinforcing insultaing layer 62, and an outer supplemental insulating layer 63. Reinforcing insulating layer 62 is preferably formed by a strip of U-shape cross section and is disposed in such a manner that the bottom of U-shape points outside. Since the reinforcing insulating layers 54 and 62 are made of U-shape cross section and are disposed in the above manner, the main conductor 50 can be cooled effectively by cooling liquid which acts through a thin insulating layer 55 alone while creep dielectric strength as well as puncture dielectric strength between the main conductor 50 and the shielding conductor 60 can be maximized. The layer 62 is preferably made of insulating resin similar to that used in forming reinforcing insulating layer 54. The insulating layer 55 and 63 of main conductor 50 and shielding conductor coil 60 may be made of usual insulating paper such as kraft paper.

Figure 5:
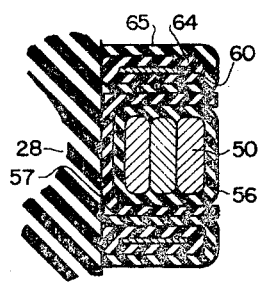
FIGURE 5 is a sectional view showing in detail the construction of the main conductor and the shielding conductor arrangement shown in FIGURE 4.

FIGURES 4 and 5 show another embodiment of the invention wherein main conductor 50 and shielding conductor coil 60 are formed differently. In this embodiment, a reinforcing insulating layer 57 of U-shape cross section is provided outside a coating insulating layer 56 of main conductor 50 in such a manner that the bottom of the U-shape adjoins the laminated insulator 28. Similarly, a reinforcing insulating layer 65 of U-shape cross section is provided outside a coated insulating layer 64 of shielding conductor 60 in such a manner that the open ends of the U-shape adjoin the laminated insulator 28.

FIGURES 11 and 12 show the construction of the connection to an end portion of the shielding conductor 60 in the static shielding means 48 and its relation to a pulled-out terminal conductor 66 and the lead wire 49. The pulled-out terminal conductor 66 which is adapted to be connected to lead wire 49, is connected at 70 to the shielding conductor coil 60, leaving the end portion 68 thereof open between the main conductors of winding layer 24. The shielding conductor 48 is firmly secured between the main conductors 50 in the winding layer 24 by binding insulating tapes 69a, 69b, 69c and 69d. By this construction, the mechanical strength of the connection between the shielding conductor 48 and the lead wire 49 is remarkably increased. In order to avoid an extreme concentration of an electric field at the end of the shielding conductor coil 60, impedance means 71 may be provided for the end portion 68 which comprises, for example, carbon coating papers. Similar terminating impedance means may be provided at the other end of the shielding conductor coil 60 also.

In the embodiments of the invention shown in FIGURES 2–5, shielding conductor coil 60 is wound together with main conductor 50 in the winding layer 24 towards the upper end thereof and the lower end of shielding conductor coil 60 is electrically connected to the input terminal 42 by means of lead wires 49 and 43 so as to be supplied with the same potential as the upper end of the winding layer 24, i.e. the line side potential. By this construction, electrostatic coupling between shielding conductor coils and the adjoining portions of main conductor 50 is greatly increased. Hence when an impulse voltage enters into the winding, potentials of those intermediate winding portions of the winding layer 24 which adjoin to the shielding conductor coil 60 will be electrostatically coupled to and will be increased immediately without any substantial delay.

Upon the application of an impulse voltage to the winding, the input terminal side of the winding layer will not be required to withhold the entire impulse potentials but the potential will be distributed and substantially equalized along the whole length of the winding. Hence, insulation break down of the winding is effectively prevented upon entrance of an impulse voltage. Although a considerable potential difference occurs between the shielding conductor coil and the corresponding adjacent portions of main winding conductor 50 in the winding layer 24, there is no fear of insulation break down since the dielectric strength therebetween is increased by the reinforcing insulation layers 54 and 57, or 62 and 65 provided with both shielding conductor coil 60 and the corresponding portions of main conductor 50.

Another important feature of the invention is that the provision of shielding conductor coil 60 does not cause the outer diameter of the winding to be increased since shielding conductor coil 60 is wound in an axial direction between successive turns of main conductor 50 in such a manner that width of shielding conductor coil 60 measured in the radial direction is equal to or less than that of main conductor 50. The increase in an axial direction is minimal in comparison to the improved impulse potential distribution described. Accordingly, the present invention provides, a transformer which may be manufactured in a smaller size and weight for a given power rating than heretofore possible. Particularly, in a three-phase power transformer, the reduction in size and weight for a given kva. rating is dramatic. In addition, since the flat shielding conductor coil 60 adjoins broadside to the corresponding adjacent portions of main conductor 50, opposing areas therebetween are increased so as to provide maximum electrostatic coupling. Furthermore, since the outer periphery of cylindrical winding layer 24 contacts directly with cooling and insulating liquid and is cooled thereby, it can be cooled very effectively with a minimum size structure for a given kva. rating.

FIGURES 6 through 10 show other arrangements of the shielding means according to the invention. In FIGURE 6, about the central portion of the most exterior cylindrical winding layer 24 are provided separately first and second shielding coils 70 and 80. The respective lower ends of coils 70 and 80 are electrically connected to the input terminal 42 by leads wires 71 and 72. In FIGURE 7, the upper end of a shielding coil 90 wound between the intermediate turns of the winding layer 24, is electrically connected to the input terminal 42 by a lead wire 91. FIGURE 8 shows a modification of the embodiment shown in FIGURE 6 in which the upper ends of shielding coils 100 and 110 are connected to the input terminal 42 by lead wires 101 and 111. In FIGURE 9, the middle part of a shielding coil 120 interposed in the winding layer 24 is connected to the input terminal 42 by a lead wire 121.

In the embodiment of the invention shown in FIGURE 10, a shielding coil 130 is provided about the middle portion of the winding layer 24 and a supplemental shielding coil 140 of substantially the same number of turns and otherwise similar to the shielding coil 130, is provided close to the upper end of the winding layer. Both the shielding windings 130 and 140 are connected without any inductive coupling in opposing relation in such a manner that the upper end of supplemental coil 130 is connected to the lower end of shielding coil 140 by a lead wire 141. As a consequence of this construction, under steady state operating conditions, a voltage induced in supplemental coil 140 cancels a voltage induced in shielding coil 130. On the other hand, as soon as an impulse voltage or a surge voltage is applied to the winding through the input terminal 42, the voltage induced elecrostatically in supplemental coil 140 moves to shielding coil 130 and increases the potential of the middle parts of winding layer 24 which adjoins to shielding coil 130. Accordingly, delay in rise of potential about the middle parts of the winding layer 24 is greatly reduced and the potential distribution of the winding layer is improved and equalized.

The static shielding means is provided in the most exterior winding layer in the embodiments of the invention described heretofore, however, it will be apparent to those skilled in the art that the static shielding means may be also provided in the most interior winding layer or in both the most exterior winding layer and the most interior winding layer. In addition, although in the above embodiments cylindrical winding layers are provided concentrically in multiple layers and are electrically connected by lead wires that pass through radial oil ducts and outside the most exterior winding layer, if desired, they may be connected in the manner shown in FIGURE 13 where the lower end of the most exterior winding layer is connected to the lower end of the next winding layer. It will be apparent that the invention is equally applicable to this construction of multi-layer winding assembly.

Figure 13:
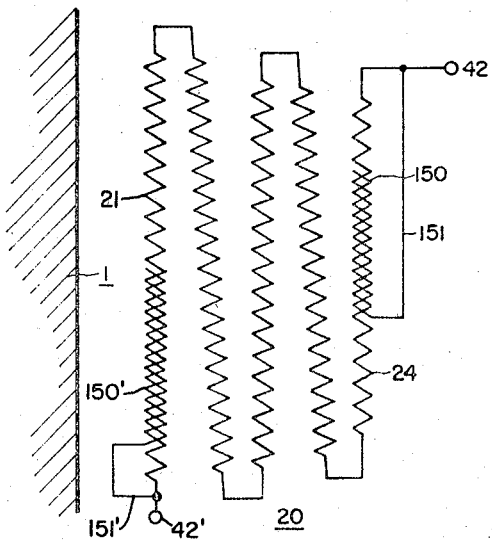
FIGURE 13 is a schematic wiring diagram of one different manner of connecting a multi-layer winding to which the present invention is applicable.

In FIGURE 13, shielding means 150 is wound in the most exterior winding layer 24 and is connected to the input terminal 42. If desired, another shielding means 150' may be provided to the most interior winding layer 21 and connected to the neutral point side or ground side terminal 42' by means of another connecting means 151'. By this configuration, it will be apparent that not only the potential distribution in the most exterior winding 24 is equalized upon entrance of an electrical surge at the line side, but also the potential distribution in the most interior winding 21 is equalized upon entrance of a surge from the ground side in contrast to ineffectively grounded transformers.

Figure 14:
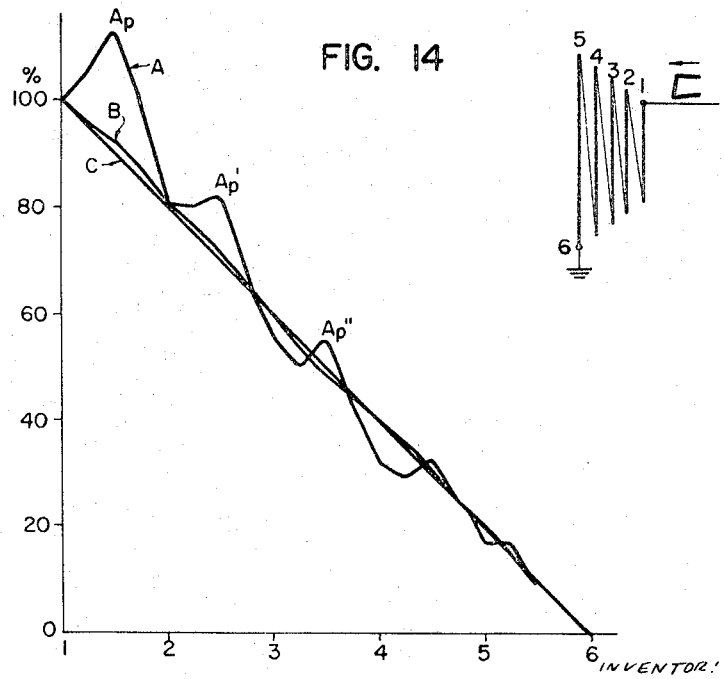
FIGURE 14 shows examples of initial potential distributions in a multi-layer winding upon the application of an impulse voltage thereto.

FIGURE 14 shows a set of impulse voltage characteristic curves of a multi-layer winding assembly having five winding layers in which initial potentials of the winding are plotted as the ordinate against length of the winding as the abscissa. A is a maximum potential distribution where no shielding means are provided to the winding assembly. Peaks $A_p$, $A_p'$ and $A_p''$ show maximum amplitudes of oscillation caused in each winding layer upon application of an impulse voltage. C is the ideal or completely equalized potential distribution. B is a maximum potential distribution according to the present invention which is obtained with respect to the embodiment shown in FIGURE 10. As clearly shown, the maximum potential distribution is remarkably improved.

It was further found according to experiments that shielding means in the most exterior winding layer might be operably connected with the lower end of the winding layer with a considerable improvement in the maximum potential distribution thereof. This is considered to be due to the phenomenon where, upon entrance of an impulse voltage into the winding, the line potential is transmitted through a series capacitance to both the upper end of the next winding layer and to the lower end of the most exterior winding layer through lead wire 44 and thus different potentials from the adjoining main conductor are supplied to the shielding means.

It will be understood, of course, that while the several forms of the invention herein shown and described constitute preferred embodiments of the invention, it is not intended to illustrate all of the possible equivalent forms or modifications thereof. It will also be understood that the words used are words of description rather than of limitation, and that various changes may be made without departing from the spirit or scope of the invention disclosed, and it is aimed in the appended claims to cover all such changes or modifications that fall within the true spirit and scope of the invention as defined by the appended claims.

I claim:

1. A multi-layer winding assembly for a stationary induction electrical apparatus comprising a plurality of multi-turn windings arranged concentrically with respect to each other and electrically interconnected, each of said windings comprising an insulating member and a main winding formed by an insulated main conductor wound around the insulating member; shielding means comprising a shielding conductor wound between at least some of the intermediate turns of at least one of the main windings with the turns of the shielding conductor and the turns of the main conductor being axially aligned and interleaved; and coupling means for supplying the shielding conductor with a different potential from that of the adjacent turns of the main conductor, said coupling means operably coupling the shielding conductor with either the potential of the line side terminal of the winding or the potential of the ground side terminal of the winding, whereby at the instant an impulse voltage is applied to the winding the potential distribution along the winding is substantially equalized.

2. A multi-layer winding assembly according to claim 1, in which the shielding means is provided in the most exterior high voltage winding and is supplied with a potential corresponding with the potential of the line side terminal of the winding.

3. A multi-layer winding assembly according to claim 2, in which the insulating members are laminated insulating cylinders concentrically arranged one within the other and the windings are helically wound around their respective insulating cylinders.

4. A multi-layer winding assembly according to claim 2, in which the line potential is supplied to the upper end of the most exterior winding and the line potential is also supplied to the lower end of the shielding conductor by means of a connecting means.

5. A multi-turn winding according to claim 1, in which the shielding means comprises a plurality of shielding conductors wound separately in one of the windings.

6. A multi-layer winding assembly according to claim 2, in which the shielding means comprises a plurality of shielding conductors wound separately in the most exterior winding and connected to the connecting means in parallel with each other for being supplied with a potential corresponding to the line potential.

7. A multi-layer winding assembly according to claim 2, in which the line potential is supplied to both the upper end of the most exterior winding and the upper end of the shielding conductor.

8. A multi-layer winding assembly according to claim 2, in which the shielding means is provided in the most interior winding layer and is supplied wth a potental correspondng with the potential of the other terminal of the winding.

9. A multi-layer winding assembly according to claim 2, in which the shielding means comprises a first shielding conductor wound in the most exterior winding with the line side potential of the windng being supplied thereto and a second shielding conductor wound in the most interior winding with the other terminal potential of the winding being supplied thereto.

10. A multi-layer winding according to claim 3, in which the shielding conductor is surrounded with a first supplemental insulator of U-shape cross section with the open ends of the U-shape being placed towards the laminated cylinder and a further coating insulator that surrounds the shielding conductor entirely, and the corresponding adjacent turns of the adjoining main conductor are surrounded with a second supplemental insulator of U-shape cross section with the bottom of the U-shape being placed towards the laminated insulating cylinder and a further second coating insulator that surrounds the main conductor entirely.

11. A multi-layer winding according to claim 10, in which the coating insulators are disposed to surround the first and second supplemental insulators, respectively.

12. A multi-layer winding according to claim 10, in which the coating insulators are surrounded by the first and second supplemental insulators, respectively.

13. A multi-turn winding according to claim 5, in which at least one of the shielding conductors is electrically connected with another shielding conductor which works as a supplemental coil and said one of the shielding conductors is supplied with the different potential by means of the supplemental coil upon entrance of an impulse voltage into the winding.

14. A multi-turn winding according to claim 13, in which said one of the shielding conductors and the supplemental coil are electrically connected in opposing relation so that the induced voltage in the one of the shielding conductors tends to be cancelled by the induced voltage in the supplemental coil during steady state operating conditions.

15. A multi-turn winding according to claim 14, in which the number of turns of the one of the shielding conductors is the same as the supplemental coil.

16. A multi-layer winding assembly in which there are a plurality of multi-turn windings according to claim 15 arranged concentrically with respect to each other and electrically interconnected and in which the plurality of the shielding conductors is wound in the most exterior winding.

17. A multi-layer winding according to claim 16, in which first and second sets of plural shielding conductors are wound in both the most exterior winding and the most interior winding and in each set the plural shielding conductors are connected with each other so that at the instant an impulse voltage enters into the winding one of the plural shielding conductors may be supplied with a potential from the other.

18. A multi-layer winding according to claim 9, in which the insulating member is comprised by a laminated insulating cylinder, each of the first and second shielding conductors is surrounded with a first supplemental insulator of U-shape cross section with the open ends of the U-shape being placed towards the laminated insulating cylinder and further coating insulators, and each of the corresponding adjacent turns of the adjoining main conductor is surrounded with a second supplemental insulator of U-shape cross section with the bottom of the U-shape being placed towards the laminated insulating cylinder and further coating insulators.

19. A multi-layer winding according to claim 1, in which the coupling means is connected with the shielding conductor close to one end of the shielding conductor with the end portion thereof leaving an opening between turns of the main conductor, and the shielding conductor and the main conductor are bound by binding means at both sides of the connection to the shielding means.

References Cited

UNITED STATES PATENTS

| | | | |
|---|---|---|---|
| 2,220,539 | 11/1940 | Panov et al. | 336—70 |
| 2,279,027 | 4/1942 | Weed et al. | 336—70 |
| 2,905,911 | 9/1959 | Kurita | 336—70 |
| 3,327,268 | 6/1967 | Rabus | 336—84 |

FOREIGN PATENTS 673,956 4/1968 Germany.

LEWIS H. MYERS, Primary Examiner

T. J. KOZMA, Assistant Examiner

U.S. Cl. X.R.

336—223